United States Patent
Kameda et al.

(10) Patent No.: US 8,243,386 B2
(45) Date of Patent: Aug. 14, 2012

(54) PERPENDICULAR MAGNETIC RECORDING HEAD WITH BOTTOM SHIELD LAYER

(75) Inventors: Hiroshi Kameda, Tokyo (JP); Takahiro Taoka, Tokyo (JP)

(73) Assignee: TDK Corporation, Tokyo (JP)

( * ) Notice: Subject to any disclaimer, the term of this patent is extended or adjusted under 35 U.S.C. 154(b) by 719 days.

(21) Appl. No.: 12/108,160

(22) Filed: Apr. 23, 2008

(65) Prior Publication Data

US 2008/0266710 A1  Oct. 30, 2008

(30) Foreign Application Priority Data

Apr. 25, 2007 (JP) ................. P2007-115680

(51) Int. Cl.
*G11B 5/127* (2006.01)
(52) U.S. Cl. .................................. 360/125.09
(58) Field of Classification Search ............. 360/125.09
See application file for complete search history.

(56) References Cited

U.S. PATENT DOCUMENTS

| | | | | |
|---|---|---|---|---|
| 6,950,277 B1 * | 9/2005 | Nguy et al. | ............. | 360/125.14 |
| 6,954,340 B2 * | 10/2005 | Shukh et al. | ............. | 360/317 |
| 7,002,775 B2 * | 2/2006 | Hsu et al. | ............. | 360/125.03 |
| 7,196,871 B2 * | 3/2007 | Hsu et al. | ............. | 360/125.03 |
| 7,322,095 B2 | 1/2008 | Guan et al. | | |
| 7,440,230 B2 * | 10/2008 | Hsu et al. | ............. | 360/125.3 |
| 2002/0176214 A1 * | 11/2002 | Shukh et al. | ............. | 360/317 |
| 2003/0043513 A1 * | 3/2003 | Lin | ............. | 360/317 |
| 2005/0057852 A1 | 3/2005 | Yazawa et al. | | |
| 2005/0068669 A1 * | 3/2005 | Hsu et al. | ............. | 360/125 |
| 2005/0141137 A1 | 6/2005 | Okada et al. | | |
| 2006/0221497 A1 * | 10/2006 | Okada et al. | ............. | 360/125 |
| 2006/0238918 A1 * | 10/2006 | Kato et al. | ............. | 360/126 |
| 2006/0245108 A1 | 11/2006 | Hsu et al. | | |
| 2007/0253107 A1 * | 11/2007 | Mochizuki et al. | ............. | 360/126 |
| 2007/0268626 A1 * | 11/2007 | Taguchi et al. | ............. | 360/126 |

FOREIGN PATENT DOCUMENTS

| | | |
|---|---|---|
| JP | A-2005-092929 | 4/2005 |
| JP | A-2005-174449 | 6/2005 |
| JP | A-2005-190518 | 7/2005 |
| JP | A-2005-310363 | 11/2005 |
| JP | A-2006-309930 | 11/2006 |

* cited by examiner

*Primary Examiner* — David D Davis
(74) *Attorney, Agent, or Firm* — Oliff & Berridge, PLC

(57) ABSTRACT

In a perpendicular magnetic recording head in which a magnetic pole part of a main magnetic pole layer exposed at a medium-opposing surface exhibits a trapezoidal form narrower at a leading edge than at a trailing edge on the return yoke layer side, a bottom shield layer made of a soft magnetic material is provided below the leading edge of the magnetic pole part of the main magnetic pole layer in the track width direction while interposing a nonmagnetic material layer therebetween. The gap between the bottom shield layer and the leading edge of the magnetic pole part is set to less than 60 nm.

7 Claims, 8 Drawing Sheets

PERPENDICULAR MAGNETIC RECORDING HEAD WITH BOTTOM SHIELD LAYER

BACKGROUND OF THE INVENTION

1. Field of the Invention

The present invention relates to a perpendicular magnetic recording head which is driven with a skew angle and performs a recording action by applying a recording magnetic-field perpendicularly to a recording medium plane.

2. Related Background Art

As is well-known, a perpendicular magnetic recording head includes a main magnetic pole layer and a return yoke layer which have front end faces exposed at a surface opposing a recording medium (medium-opposing surface) and are magnetically coupled to each other on the deeper side of the medium-opposing surface in the height direction, a magnetic gap layer interposed between the main magnetic pole layer and return yoke layer on the medium-opposing surface, and a coil layer inducing a recording magnetic field between the main magnetic pole layer and return yoke layer upon energization. The recording magnetic field induced between the main magnetic pole layer and return yoke layer perpendicularly enters a hard film of the recording medium from the front end face of the main magnetic pole layer and returns to the front end face of the return yoke layer through a soft film of the recording medium. This performs magnetic recording at a part opposing the front end face of the main magnetic pole layer. The size in the track width direction of the front end face of the main magnetic pole layer, i.e., recording track width size, has been becoming narrower as hard disk drives have been attaining higher recording densities.

In a perpendicular magnetic recording head having a narrowed track, how to suppress side fringing at the time of skewing where the head is driven in a state tilted with respect to a recording medium has become a problem.

As a method of suppressing side fringing at the time of skewing, it has conventionally been known to make a magnetic pole part of the main magnetic pole layer (the front end face exposed at the medium-opposing surface) attain a trapezoidal (bevel) form which is narrower on the leading edge side than on the trailing edge side when seen from the medium-opposing surface side. When the magnetic pole part of the main magnetic pole layer is narrower on the leading edge side than on the trailing edge side, magnetic fields leaking from side faces in the track width direction of the main magnetic pole layer at the time of skewing do not reach adjacent tracks on the recording medium, whereby recording actions with less bleeding can be realized. The effect of suppressing side fringing becomes stronger as the bevel angle of the main magnetic pole layer is greater. However, the main magnetic pole layer with a narrowed track has a very small size in the track width direction. Therefore, when the bevel angle becomes greater, the main magnetic pole layer is shaved on the leading edge side, so as to exhibit an inverted triangular form, thereby failing to keep the size in the thickness direction. Since the main magnetic pole layer is formed by CMP (Chemical Mechanical Polishing) up to a position yielding a desirable thickness size after attaining a bevel form, fluctuations in the track width size due to CMP errors increases when the bevel angle becomes greater. Hence, it has not been possible for the main magnetic pole layer to attain a predetermined bevel angle or greater and fully suppress the side fringing.

Therefore, it has recently been proposed to provide a magnetic shield layer about the main magnetic pole layer as described in Japanese Patent Application Laid-Open Nos. 2005-92929, 2005-190518, 2005-310363, 2005-174449 and 2006-309930.

SUMMARY OF THE INVENTION

When the shield layer is provided like a flat film surrounding the main magnetic pole layer as in the Japanese Patent Application Laid-Open Nos. 2005-92929, 2005-190518 and 2005-310363, however, not only leakage magnetic fluxes from sides of the main magnetic pole layer but also recording magnetic fluxes applied from the main magnetic pole layer to the recording medium are absorbed by the shield layer, whereby the recording magnetic field becomes extremely small. When the recording magnetic field intensity becomes extremely small as such, recording actions cannot be performed for recording media having a high coercively, whereby the total recording performance will deteriorate even if the recording magnetic field gradient improves.

Though the Japanese Patent Application Laid-Open No. 2005-174449 discloses a structure in which a magnetic bias film 112 is formed on both sides in the track width direction of a soft magnetic film 111 which is a part of a recording magnetic pole film 11, this magnetic bias film 112 is a film for applying a magnetic bias in the direction of axis of easy magnetization to the soft magnetic film 111 and in contact with the soft magnetic film 111, and thus does not have a shield function for absorbing leakage magnetic fields of the soft magnetic film 111.

The Japanese Patent Application Laid-Open No. 2006-309930 discloses a write magnetic pole 302, a return magnetic pole 304, and a magnetic shield 330 which is magnetically coupled to the return magnetic pole 304 in the vicinity of an ABS and extends to the write magnetic pole 302. However, the magnetic shield 330 is one which is positioned between the write magnetic pole 302 and return magnetic pole 304 on the ABS in order to absorb external magnetic fields from a write coil, a shaping layer, or the like, and has a notch 402 for providing a necessary gap between the shield 330 and write magnetic pole 302 at an edge part near the write magnetic pole 302 so as not to absorb magnetic fields from the write magnetic pole 302. The notch 402 secures a minimum spacing D1 of 0.4 to 3.0 μm between the leading edge 412 of the write magnetic pole 302 and the magnetic shield 330, and a minimum spacing D2 of about 3 to 10 μm between each of the side faces 415, 417 of the write magnetic pole 302 and the magnetic shield 330. Therefore, side magnetic fluxes spreading from sides of the write magnetic pole 302 are not absorbed by the magnetic shield 330, whereby side fringing at the time of skewing cannot be suppressed.

It is an object of the present invention to provide a perpendicular magnetic recording head which can suppress side fringing at the time of skewing and favorably keep both of the recording magnetic field intensity and recording magnetic field gradient.

The present invention is achieved by focusing attention on the fact that, when a shield layer is not provided on the trailing edge side of the main magnetic pole layer but partly on the leading edge side thereof, leakage magnetic fluxes occulting on the leading edge side are absorbed by the shield layer, so that side fringing at the time of skewing can be suppressed, while magnetic fluxes transmitted to the trailing edge side are not absorbed, whereby the recording magnetic field intensity applied to the recording medium can be restrained from decreasing.

The present invention is a perpendicular magnetic recording head comprising a main magnetic pole layer including a magnetic pole part exposed at a surface opposing a recording medium, a return yoke layer laminated with a predetermined distance on the main magnetic pole layer and magnetically coupled to the main magnetic pole layer on the deeper side of the medium-opposing surface in a height direction, and a nonmagnetic material layer covering the main magnetic pole layer, the magnetic pole part exhibiting a trapezoidal form narrower at a leading edge side than at a trailing edge side on the return yoke layer side when seen from the medium-opposing surface; wherein a bottom shield layer formed with macroscopically flat and made of soft magnetic material is provided below the leading edge of the magnetic pole part of the main magnetic pole layer while interposing the nonmagnetic material layer therebetween; and wherein the bottom shield layer and the leading edge of the magnetic pole part oppose each other with a gap smaller than 60 nm therebetween.

Preferably, the bottom shield layer has a thickness of more than 90 nm. As the bottom shield layer has a greater thickness, it is harder to cause magnetic saturation even when absorbing magnetic fluxes leaking from the leading edge of the magnetic pole part of the main magnetic pole layer and can absorb a larger amount of leakage magnetic fluxes.

Preferably, the bottom shield layer has both ends in the track width direction extending from both side face positions in the track width direction of the magnetic pole part of the main magnetic pole layer. This mode allows the bottom shield layer to securely absorb magnetic fluxes leaking from the leading edge of the magnetic pole part.

The present invention provides a perpendicular magnetic recording head in which the bottom shield layer absorbs leakage magnetic fluxes from the leading edge of the magnetic pole part of the main magnetic pole layer without absorbing recording magnetic fluxes directed from the trailing edge side to the recording medium, so as to suppress side fringing at the time of skewing, thereby improving the recording magnetic field gradient and being able to favorably keep the improved recording magnetic field gradient.

DESCRIPTION OF THE PREFERRED EMBODIMENTS

In the following, the present invention will be explained with reference to the drawings. In each drawing, X, Y, and Z directions are defined by the track width direction, the height direction, and the laminating direction (thickness direction) of layers constituting a perpendicular magnetic recording head, respectively.

FIGS. 1 to 5 show the perpendicular magnetic recording head H in accordance with an embodiment of the present invention.

Figure 1:
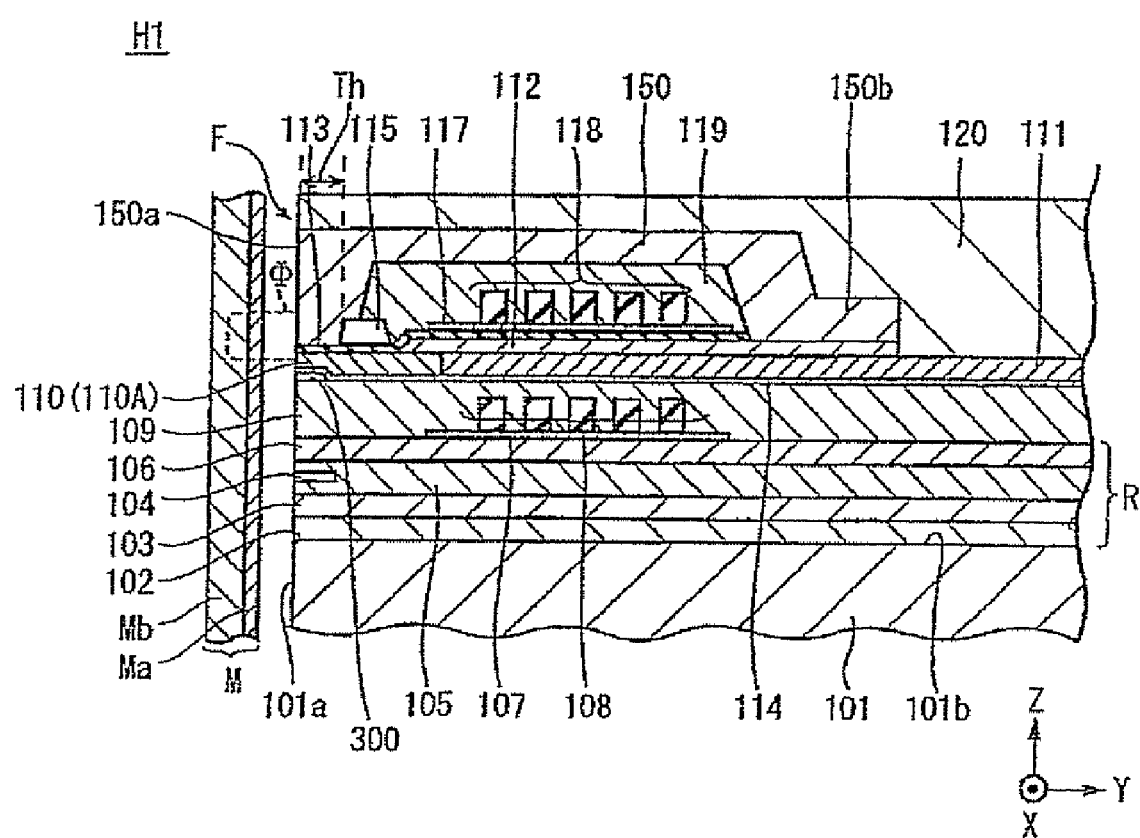
FIG. 1 is a sectional view showing the overall structure of the perpendicular magnetic recording head in accordance with an embodiment of the present invention.

FIG. 1 is a vertical sectional view showing the overall structure of the perpendicular magnetic recording head H. The perpendicular magnetic recording head H provides a recording medium M with a recording magnetic flux Φ perpendicular thereto, thereby perpendicularly magnetizing a hard film Ma of the recording medium M. The recording medium M has the hard film Ma with a higher remanent magnetization on the medium surface side and a soft film Mb with a higher magnetic permeability on the inner side of the hard film Ma. The recording medium M is shaped like a disk, for example, and is rotated about the center of the disk as a rotary axis. A slider 101 is formed by a nonmagnetic material such as $Al_2O_3.TiC$. The slider 101 has a medium-opposing surface 101a opposing the recording medium M. As the recording medium M rotates, a surface airflow levitates the slider 101 from the surface of the recording medium M.

The trailing-side end face 101b of the slider 101 is formed with a nonmagnetic insulating layer 102 made of an inorganic material such as $Al_2O_3$ or $SiO_2$, while a reproducing part R is formed on the nonmagnetic insulating layer 102. The reproducing part R has a lower shield layer 103, an upper shield layer 106, an inorganic insulating layer (gap insulating layer) 105 tilling the gap between the lower and upper shield layers 103, 106, and a reproducing element 104 positioned within the inorganic insulating layer 105. The reproducing element 104 is a magnetoresistive element such as AMR, GMR, or TMR.

By way of a coil insulating underlayer 107, a first coil layer 108 constituted by a plurality of lines made of a conductive material is formed on the upper shield layer 106. The first coil layer 108 is made of at least one nonmagnetic metal material selected from Au, Ag, Pt, Cu, Cr, Al, Ti, NiP, Mo, Pd, and Rh, for example. It may have a multilayer structure in which such nonmagnetic metal materials are laminated. A coil insulating layer 109 made of $Al_2O_3$, $SiO_2$, or the like is formed about the first coil layer 108.

The upper face of the coil insulating layer 109 is made flat. An undepicted plating underlayer is formed as a layer on the upper side of the flat surface, while a main magnetic pole layer 110 made of a ferromagnetic material having a high saturated magnetic flux density such as Ni—Fe, Co—Fe, or Ni—Fe—Co is formed on the plating underlayer.

Figure 2:
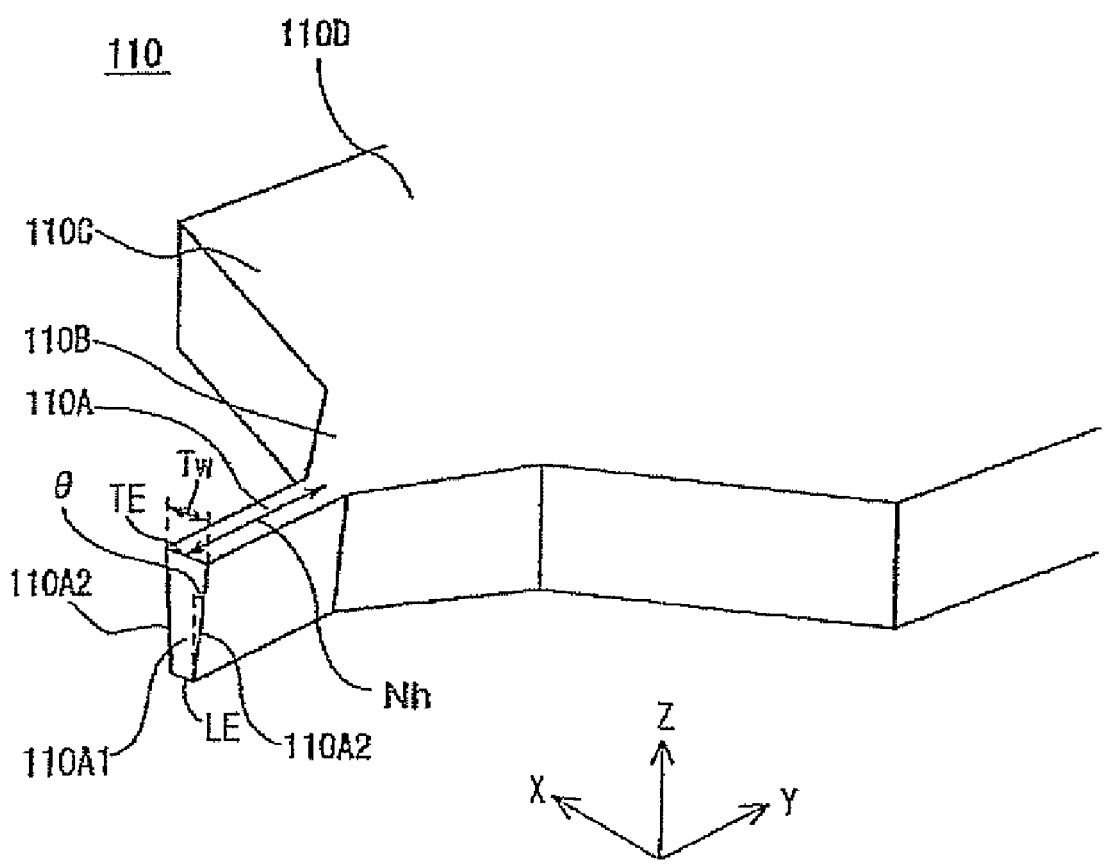
FIG. 2 is a perspective view for explaining the main magnetic pole form.

As shown in FIG. 2, the main magnetic pole layer 110 has a magnetic pole part (pole straight part) 110A, a 1st flare part 110B, a 2nd flare part 110C, and a base part 110D successively from the medium-opposing surface F side. The magnetic pole part 110A has a front end face 110A1 exposed at the medium-opposing surface F. Its size in the track width direction at the trailing edge TE is defined by a recording track width Tw, while its size in the height direction is defined by a predetermined neck height Nh. The magnetic pole part 110A uniformly yields a trapezoidal (bevel) form which is narrower on the leading edge side LE than on the trailing edge side TE throughout its length when seen from the medium-opposing surface F. Beveling the magnetic pole part 110A can reduce leakage magnetic fields reaching from the leading edge LE side to the recording medium M, thereby yielding the side fringing suppressing effect. At present, the recording track width Tw is about 50 to 150 nm, the neck height Nh is about 10 to 200 nm, the thickness is about 180 to 350 nm, and the bevel angle θ is about 6 to 15°. The 1st flare part 110B is an area for narrowing the recording magnetic field from the base part 110D to the magnetic pole part 110A and expands the size in the track width direction from the magnetic pole part 110A to the deeper side in the height direction. The 2nd flare part 110C is an area for adjusting a domain structure generated in the base part 110D after excitation such that it is oriented in the track width direction, and joins the 1st flare part 110B and the base part 110D to each other. The main magnetic pole layer 110 of this embodiment is not formed on the whole coil insulating layer 109 but locally on only the medium-opposing surface F side thereof; and is magnetically connected to an auxiliary yoke layer 112 at the base part 110D. The auxiliary yoke layer 112 is made of a magnetic material having a saturated magnetic flux density lower than that of the main magnetic pole layer 110 and transmits magnetic fluxes of the recording magnetic field induced by the recording coil (first and second coil layers 108, 118) to the main magnetic pole layer 110. A nonmagnetic material layer 111 is formed about the main magnetic pole layer 110, and is made flat such that the upper face of the main magnetic pole layer 110 is flush with the upper face of the nonmagnetic material layer 111.

A magnetic gap layer 113 made of an inorganic nonmagnetic insulating material such as $Al_2O_3$ or $SiO_2$, for example, is formed by a thickness corresponding to a predetermined gap distance on the main magnetic pole layer 110 and auxiliary yoke layer 112. The thickness of the magnetic gap layer 113 is about 50 nm at present. On the magnetic gap layer 113, a height determining layer 115 is formed at a position retracted from the medium-opposing surface F by a predetermined throat height Th to the deeper side in the height direction, while the second coil layer 118 is formed on the deeper side of the height determining layer 115 in the height direction by way of a coil insulating underlayer 117.

As with the first coil layer 108, the second coil layer 118 is formed by a plurality of lines made of a conductive material. For example, the second coil layer 118 is made of at least one nonmagnetic metal material selected from Au, Ag, Pt, Cu, Cr, Al, Ti, NiP, Mo, Pd, and Rh. It may have a multilayer structure in which such nonmagnetic metal materials are laminated. The first and second coil layers 108, 118 are electrically connected to each other at their end parts in the track width direction (depicted X direction) so as to form a solenoid. The form of coil layers (magnetic field generating means) is not limited to the solenoid form, though. A coil insulating layer 119 is formed about the second coil layer 118.

A return yoke layer 150 made of a ferromagnetic material having a high saturated magnetic flux density such as Ni—Fe, Co—Fe, or Ni—Fe—Co is formed such as to extend over the coil insulating layer 119, height determining layer 115, and magnetic gap layer 113. The return yoke layer 150 has a front end face 150a, which is exposed at the medium-opposing surface F and opposes the magnetic pole part 110A of the main magnetic pole layer 110 while interposing the magnetic gap layer 113 therebetween, and a connecting part 150b magnetically connecting with the base part 110D of the main magnetic pole layer 110 through the auxiliary yoke layer 112 on the deeper side in the height direction. The throat height Th of the return yoke layer 150 is determined by the height determining layer 115. The return yoke layer 150 is covered with a protecting layer 120 made of an inorganic nonmagnetic insulating material.

Figure 3:
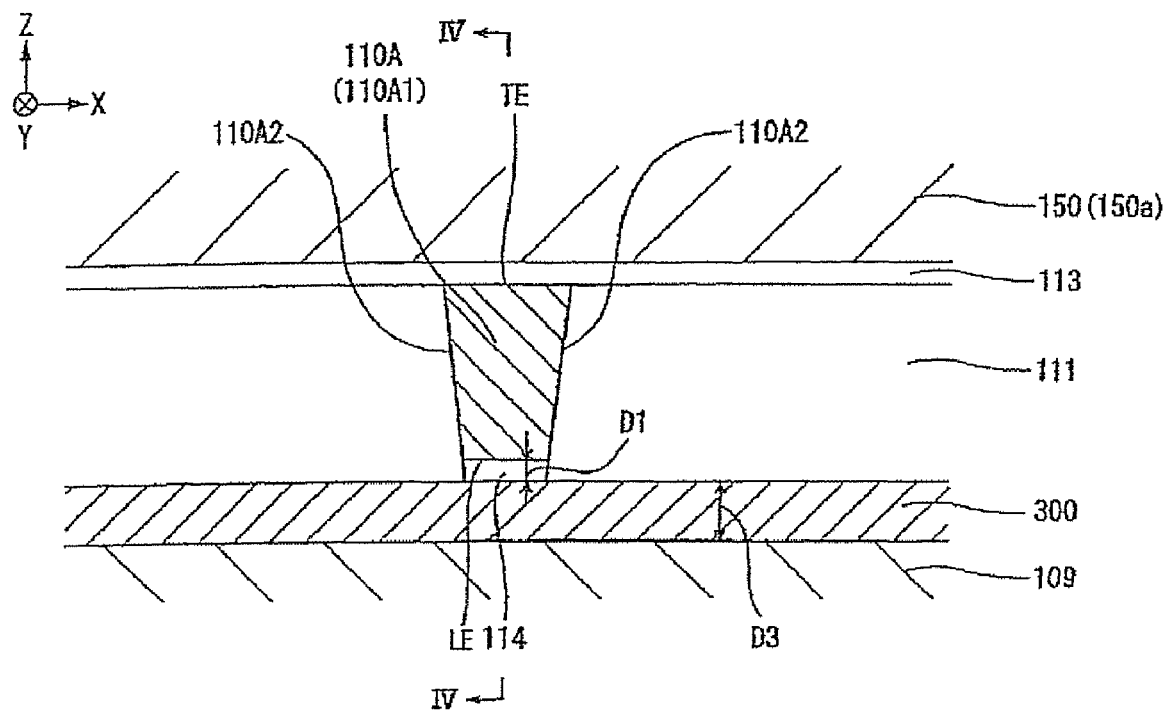
FIG. 3 is a sectional view showing the structure of the main magnetic pole layer and its surroundings including a bottom shield layer as seen from the medium-opposing surface side.
Figure 4:
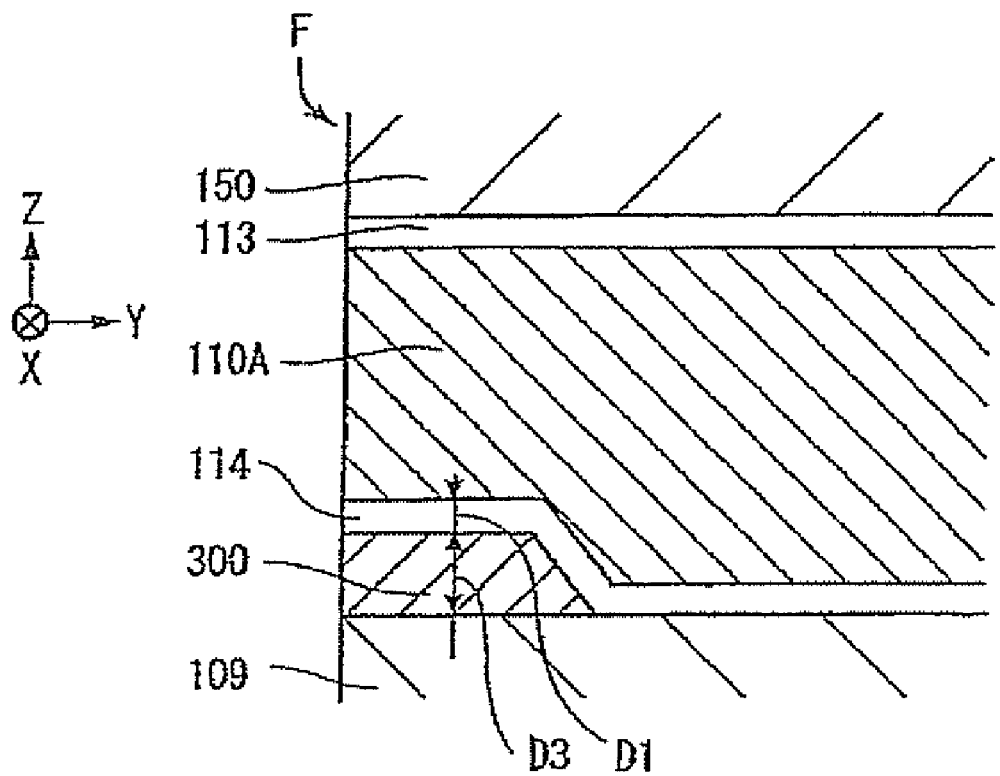
FIG. 4 is a sectional view taken along the line IV-IV of FIG. 3.
Figure 5:
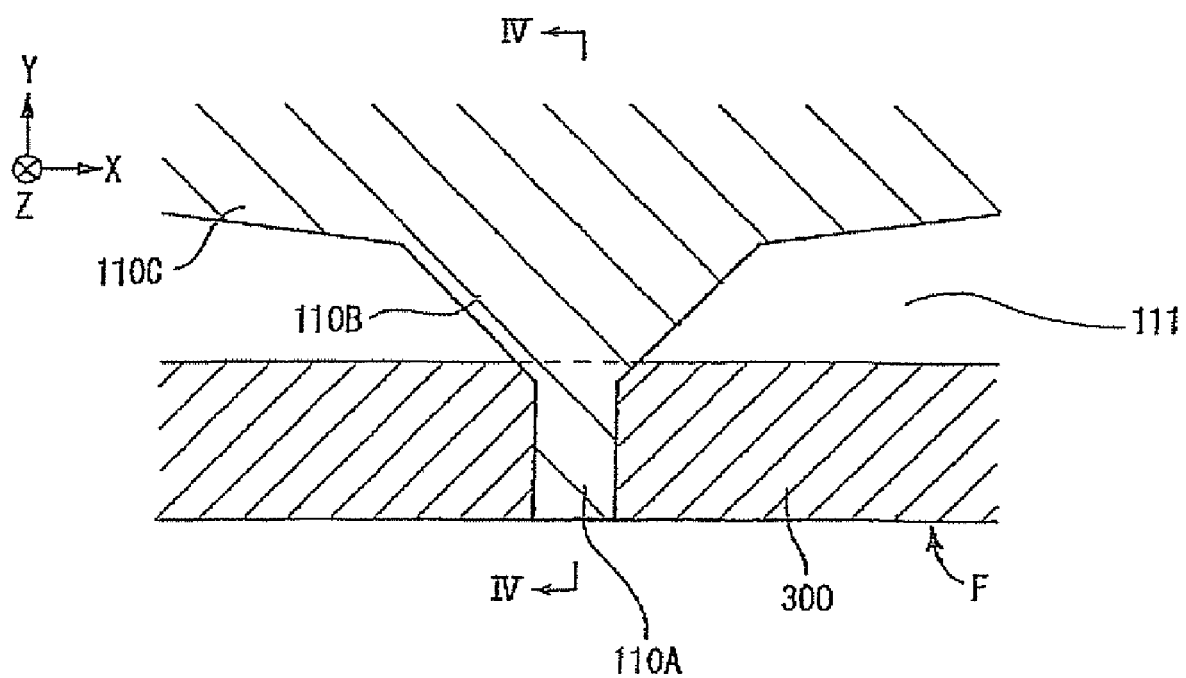
FIG. 5 is a plan view showing the bottom shield layer.

As shown in FIGS. 3 to 5, the perpendicular magnetic recording head H having the foregoing overall structure includes a bottom shield layer 300 below the leading edge LE of the magnetic pole part 110A of the main magnetic pole layer 110 while interposing a nonmagnetic material layer 114 therebetween. FIG. 3 is a vertical sectional view showing a structure of the main magnetic pole and thereabout including the bottom shield layer 300 under magnification. FIG. 4 is a transverse sectional view taken along the line IV-IV of FIGS. 3 and 5. FIG. 5 is a plan view showing the bottom shield layer 300.

The bottom shield layer 300 is a soft magnetic film formed with a uniform thickness without macroscopic irregularities on the coil insulating layer 109, opposes the leading edge LE of the magnetic pole part 110A of the main magnetic pole layer 110 in parallel therewith, and has a magnetic shield function for absorbing magnetic fluxes leaking from the leading edge LE. The bottom shield layer 300 has end parts in the track width direction extending longer than both side faces 110A2 in the track width direction of the magnetic pole part 110A while extending in the height direction from the magnetic pole part 110A of the main magnetic pole layer 110 to a part of the 1st flare part 110B, thereby yielding a substantially oblong two-dimensional form. It will be sufficient if the bottom shield layer 300 exists at least below the leading edge LE of the magnetic pole part 110A. The bottom shield layer 300 may be formed as not a partial film but a solidly filled film on the coil insulating layer 109.

The bottom shield layer 300 is placed in a magnetically isolated state (without any magnetic connection to other magnetic material layers) by the nonmagnetic material layers 111, 114 formed thereabout. Though not depicted, the nonmagnetic material layer 111 is also interposed between the bottom shield layer 300 and the return yoke layer 150.

For absorbing more of magnetic fluxes leaking from the leading edge LE of the magnetic pole part 110A of the main magnetic pole layer 110, the gap D1 between the bottom shield layer 300 and the leading edge LE of the magnetic pole part 110A is set to 20 to 60 nm, preferably less than 60 nm, 50 nm or less, for example. Its thickness D3 is set to more than 80 nm, preferably more than 90 ml. The thickness D3 is practically 40 nm or less in view of the read/write distance. As the gap D1 between the bottom shield layer 300 and the leading edge LE of the magnetic pole part 110A decreases, a greater amount of magnetic fluxes is absorbed by the bottom shield layer 300. As the thickness D3 increases, the amount of magnetic fluxes absorbed by the bottom shield layer 300 becomes greater, while magnetic saturation is harder to occur even when leakage magnetic fluxes are absorbed from the leading edge LE. The gap D1 between the bottom shield layer 300 and the leading edge LE of the magnetic pole part 110A can be defined by the thickness of the nonmagnetic material layer 114.

Figure 6:
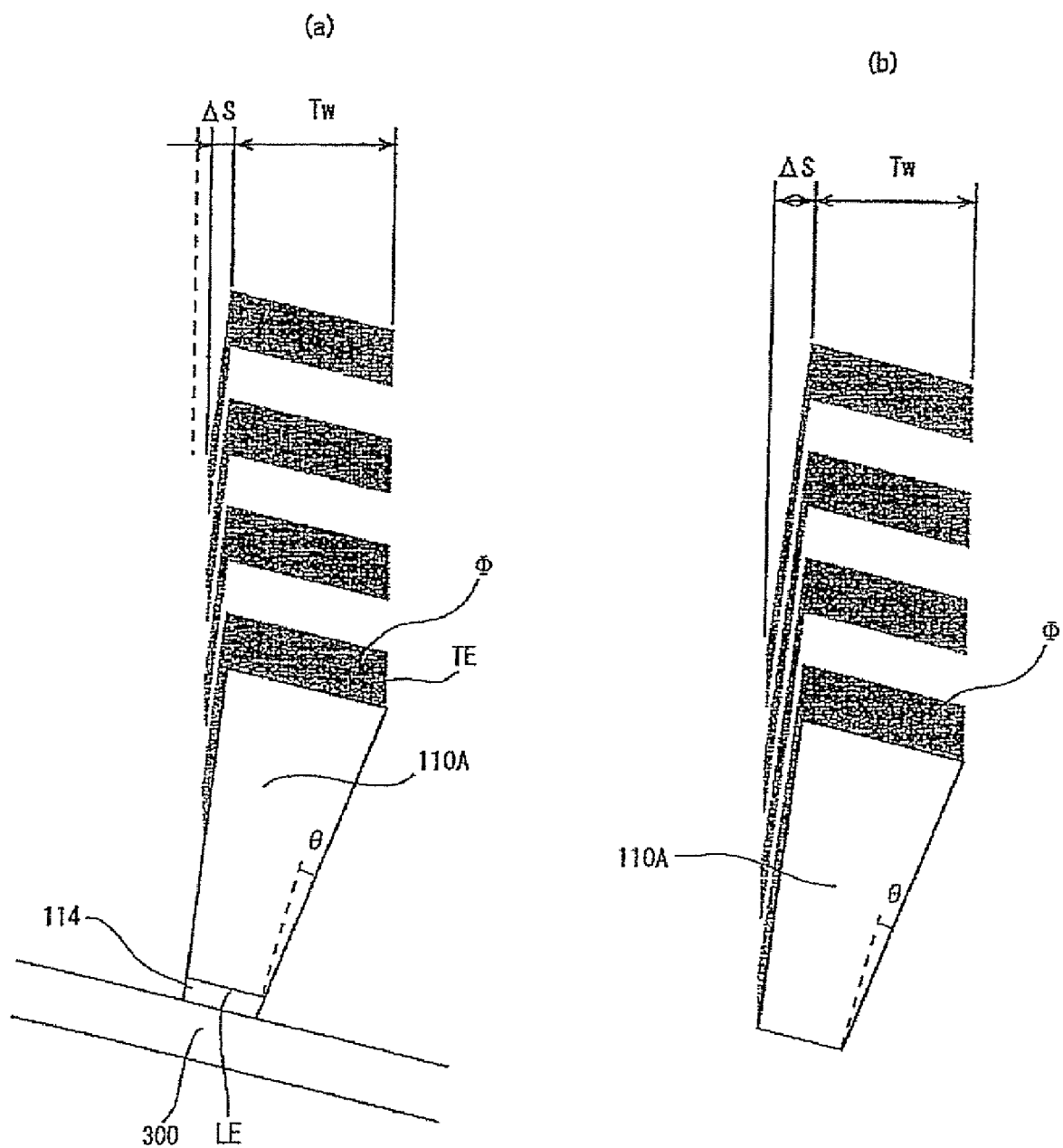
FIG. 6 is a schematic view for explaining recording magnetic field patterns at the time of skewing, representing a case (a) where the bottom shield layer is provided and a case (b) where the bottom shield layer is not provided.

By an undepicted driving means, the perpendicular magnetic recording head H is driven with a skew angle in a radial direction of the recording medium M (from its inner peripheral side to outer peripheral side or vice versa), so as to levitate in a state where the slider 101 is tilted with respect to the recording medium M (recording medium plane). The magnetic flux generated upon energization of the recording coil (first and second coil layers 108, 118) is transmitted from the auxiliary yoke layer 112 to the base part 110D of the main magnetic pole layer 110, narrowed through the 2nd flare part 110C and 1st flare part 110B from the base part 110D, and then perpendicularly applied as the recording magnetic field Φ from the front end face 110A1 of the magnetic pole part 110A to the recording medium M. This records magnetic information onto the recording medium M. At the time of this recording action, the bottom shield layer 300 absorbs magnetic fluxes (leakage magnetic fields) leaking from the leading edge LE of the magnetic pole part 110A but is not involved with the recording magnetic field Φ directed from the magnetic pole part 110A to the recording medium M. At the time of skewing, the slider 101 is tilted as mentioned above, whereby the side fringing can be suppressed by reducing leakage magnetic fields occurring from the leading edge LE of the magnetic pole part 110A even when leakage magnetic fields occurring from the magnetic pole part 110A are not completely eliminated. As shown in FIG. 6, providing the bottom shield layer 300 can make the side fringe width ΔS smaller than that in the case without the bottom shield layer 300, thereby preventing problems such as recording fringing onto the recording medium M and erasing of recording information in adjacent recording tracks from occurring. At the time of no skewing (with a skew angle of 0°), the side magnetic fluxes from both side faces 110A2 are reduced by the bevel form of the magnetic pole part 110A itself, whereby the side fringing can be suppressed FIG. 6 shows the recording track width Tw and side fringe width ΔS in the case where the skew angle is 14° while the bevel angle θ of the magnetic pole part 110A is 7°. The broken line in FIG. 6(*a*) indicates the side fringe width ΔS in the case shown in FIG. 6(*b*) where the bottom shield layer 300 is not provided.

Figure 7:
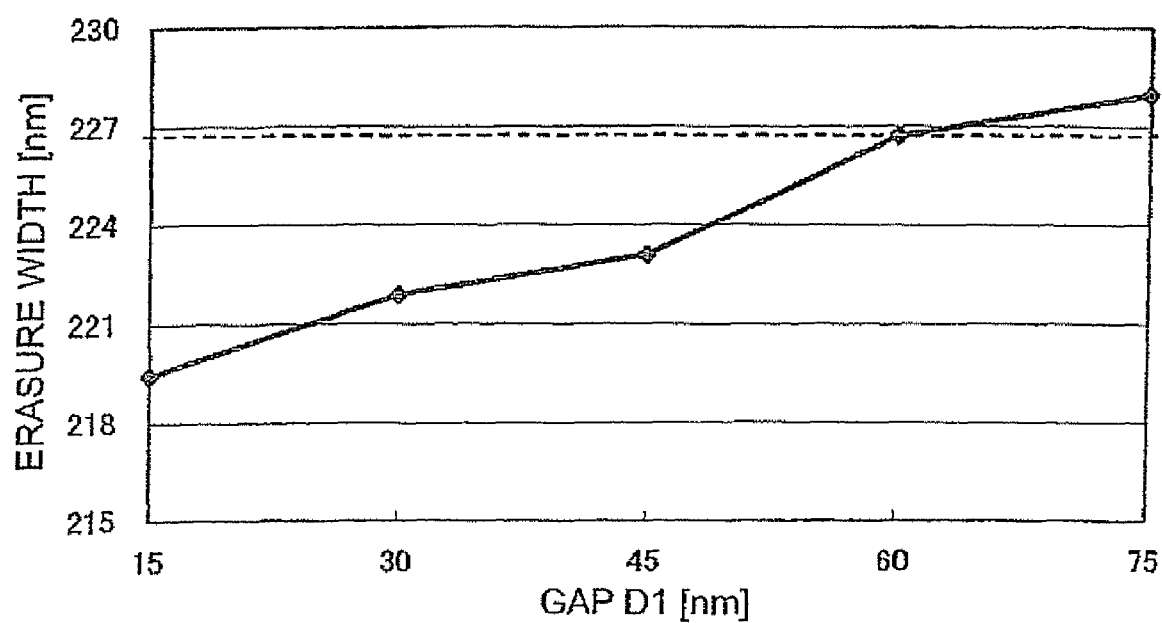
FIG. 7 is a graph showing results of a simulation concerning the relationship between the gap between the bottom shield layer and the leading edge of the magnetic pole part and the erasure width.
Figure 8:
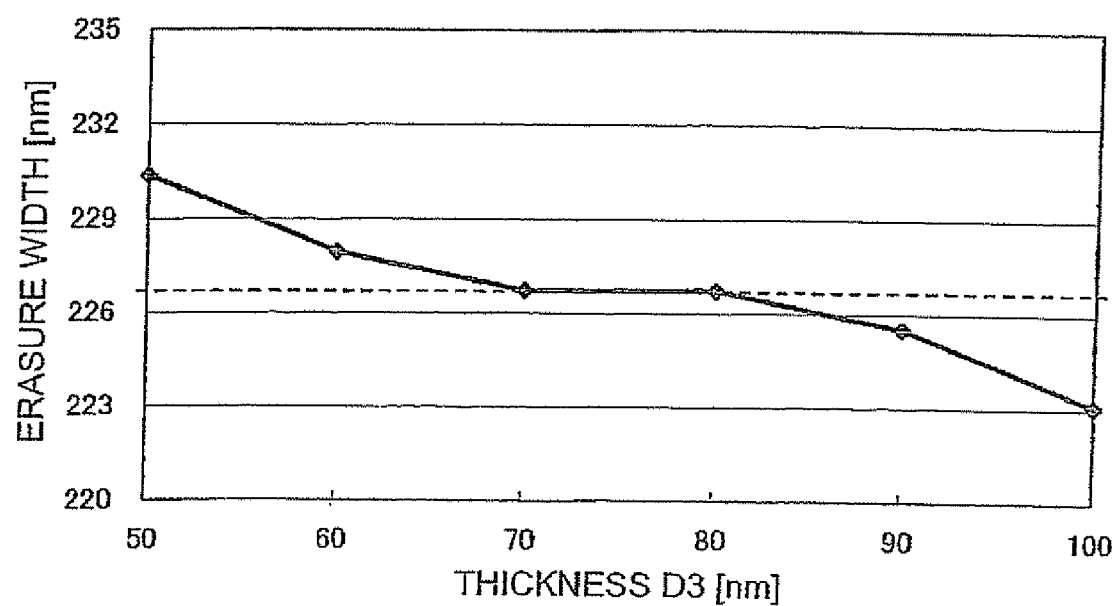
FIG. 8 is a graph showing results of a simulation concerning the relationship between the thickness of the bottom shield layer and the erasure width.

FIGS. 7 and 8 show results of simulations measuring the erasure width [nm] while changing the gap D1 [nm] between the bottom shield layer 300 and the leading edge LE of the magnetic pole part 110A in the perpendicular magnetic recording head H and the thickness D3 [nm] of the bottom shield layer 300.

Here, the erasure width is the total of the recording track width Tw and side fringe width ΔS of the magnetic pole part 110A of the main magnetic pole layer 110 shown in FIG. 6, and is a width magnetically acting on the recording medium M in practice when the perpendicular magnetic recording head H is driven with a skew angle of 14°. Broken lines in FIGS. 7 and 8 show the erasure width in the case where the bottom shield layer 300 is not provided.

In the simulations of FIGS. 7 and 8, the condition on the perpendicular magnetic recording head side is as follows:
Recording track width Tw=125 nm
Neck height Nh=100 nm
Saturated magnetic flux density of the main magnetic pole layer=2.3 T
Throat height Th=300 nm
Recording gap=50 nm
Open angle of the 1st flare part=40°
Open angle of the 2nd flare part=70°
Bevel angle θ=9°
Thickness of the auxiliary yoke layer=0.4 μm
Saturated magnetic flux density of the auxiliary yoke layer=1.8 T In the simulation of FIG. 7, the gap D1 [nm] between the bottom shield layer 300 and the leading edge LE of the magnetic pole part 110A is changed while the thickness D3 of the bottom shield layer 300 is set to 100 nm. In the simulation of FIG. 8, the thickness D3 [nm] of the bottom shield layer 300 is changed, while the gap D1 between the bottom shield layer 300 and the leading edge LE of the magnetic pole part 110A is set to 45 nm.

As shown in FIG. 7, it is clear that, when the gap D1 between the bottom shield layer 300 and the leading edge LE of the magnetic pole part 110A is less than 60 nm, the magnetic track width becomes smaller than that in the case without the bottom shield layer 300, whereby the side fringing at the time of skewing is suppressed. When the gap D1 is 60 nm or more, on the other hand, the magnetic track width is greater than that in the case without the bottom shield layer 300, whereby the side fringing suppressing effect by the bottom shield layer 300 cannot be obtained. According to these results of the simulation, the gap D1 is set to 50 nm or less in this embodiment.

As shown in FIG. 8, it is clear that, when the thickness D3 of the bottom shield layer 300 is greater than 80 nm, the magnetic track width becomes smaller than that in the case without the bottom shield layer 300, whereby the side fringing at the time of skewing is suppressed. When the thickness D3 of the bottom shield layer 300 is 80 nm or less, on the other hand, the magnetic track width is equal to or greater than that in the case without the bottom shield layer 300, whereby the side fringing suppressing effect by the bottom shield layer 300 cannot be obtained. According to these results of the simulation, the thickness D3 is set to more than 90 nm in this embodiment.

In this embodiment, as in the foregoing, the bottom shield layer 300 provided below the leading edge LE of the magnetic pole 110A of the main magnetic pole layer 110 absorbs magnetic fluxes leaking from the leading edge LE of the magnetic pole part 110A but is not involved with the recording magnetic field Φ directed from the magnetic pole part 110A to the recording medium M, and thus can suppress the side fringing at the time of skewing, while favorably keeping the recording magnetic field intensity, thereby enhancing the recording magnetic field gradient. Therefore, even when the bevel angle imparted to the magnetic pole part 110A of the main magnetic pole layer 110 is small, the side fringe suppressing effect similar to that in the case increasing the bevel angle of the magnetic pole part 110A can be obtained, which will be applicable to further narrower tracks in future.

It should be noted that the above-described embodiments all were described as illustrative of the present invention but not restrictive of the invention, and that the present invention can also be carried out in a variety of other modification and change forms. Therefore, the scope of the present invention should be defined by the scope of claims and scope of equivalents thereof only.

What is claimed is:

1. A perpendicular magnetic recording head comprising:
a main magnetic pole layer including a magnetic pole part exposed at a surface opposing a recording medium,
a return yoke layer laminated with a predetermined distance on the main magnetic pole layer and magnetically coupled to the main magnetic pole layer on a deeper side of the medium-opposing surface in a height direction, and
a nonmagnetic material layer arranged under the magnetic pole part, the magnetic pole part exhibiting a trapezoidal form narrower at a leading edge than at a trailing edge on the return yoke layer side when seen from the medium-opposing surface;
wherein a bottom shield layer formed with macroscopically flat and made of a soft magnetic material is provided below the leading edge of the magnetic pole part of the main magnetic pole layer such that the nonmagnetic material layer is interposed between the bottom shield layer and the leading edge of the magnetic pole part, and that the magnetic pole part is interposed between the return yoke layer and the bottom shield layer with the leading edge on the bottom shield layer side and the trailing edge on the return yoke layer side, the bottom shield layer being magnetically isolated from the magnetic pole part;
wherein the bottom shield layer and the leading edge of the magnetic pole part oppose each other with a gap smaller than 60 nm and equal to or greater than 15 nm therebetween; and wherein the nonmagnetic material layer is in direct contact with both the bottom shield layer and the magnetic pole part.

2. The perpendicular magnetic recording head according to claim 1, wherein the bottom shield layer has a thickness equal to or smaller than 100 nm and more than 80 nm.

3. The perpendicular magnetic recording head according to claim 2, wherein said thickness is more than 90 nm.

4. The perpendicular magnetic recording head according to claim 1, wherein the bottom shield layer has both ends in the track width direction extending from both side face positions in the track width direction of the magnetic pole part of the main magnetic pole layer.

5. A perpendicular magnetic recording head comprising:
   a main magnetic pole layer having a magnetic pole part;
   a return yoke layer magnetically coupled to the main magnetic pole layer;
   a bottom shield layer formed with macroscopically flat and made of a soft magnetic material such that the magnetic pole part is interposed between the return yoke layer and the bottom shield layer, the bottom shield layer being magnetically isolated from the magnetic pole part; and
   a nonmagnetic material layer arranged between the bottom shield layer and magnetic pole part,
   wherein a gap between the bottom shield layer and the magnetic pole part is smaller than 60 nm and is equal to or greater than 15 nm; and
   wherein the nonmagnetic material layer is in direct contact with both the bottom shield layer and the magnetic pole part.

6. The perpendicular magnetic recording head according to claim 5, wherein
   the bottom shield layer has a thickness of more than 80 nm and is equal to or smaller than 100 nm.

7. The perpendicular magnetic recording head according to claim 6, wherein said thickness is more than 90 nm.

\* \* \* \* \*